United States Patent
Mochizuki et al.

(10) Patent No.: US 6,228,784 B1
(45) Date of Patent: May 8, 2001

(54) HEAT RESISTANT CLOTH FOR FIRE FIGHTING

(75) Inventors: Masayuki Mochizuki; Mayumi Yoshida, both of Mishima; Torataro Kobayashi, Tokyo; Kanjiro Kobayashi, Tokyo; Jutaro Kobayashi, Tokyo, all of (JP)

(73) Assignees: Toyo Metallizing Kabushiki Kaisha; Kobayashi Bokafuku Kabushiki Kaisha, both of Tokyo (JP)

( * ) Notice: Subject to any disclaimer, the term of this patent is extended or adjusted under 35 U.S.C. 154(b) by 0 days.

(21) Appl. No.: 09/123,568

(22) Filed: Jul. 27, 1998

(30) Foreign Application Priority Data

Jul. 28, 1997 (JP) .................................................. 9-201300

(51) Int. Cl.$^7$ ........................... B32B 27/16; B32B 27/04; B32P 27/12
(52) U.S. Cl. ........................... 442/136; 428/920; 428/921
(58) Field of Search .............................. 442/33, 136, 149, 442/151; 428/920, 921

(56) References Cited

U.S. PATENT DOCUMENTS

| | | | |
|---|---|---|---|
| 4,515,761 | 5/1985 | Plotzker . | |
| 4,686,135 | * 8/1987 | Obayashi et al. | 442/94 |
| 4,731,283 | 3/1988 | Sakane et al. . | |
| 5,079,295 | * 1/1992 | Furuta et al. | 525/68 |
| 5,322,727 | * 6/1994 | Yankus et al. | 442/71 |
| 5,534,338 | * 7/1996 | Saito et al. | 442/230 |

FOREIGN PATENT DOCUMENTS 62-34765 * 9/1987 (JP) .
5-3826 * 1/1993 (JP) .

* cited by examiner

Primary Examiner—Terrel Morris
Assistant Examiner—Ula C. Ruddock
(74) Attorney, Agent, or Firm—Ladas & Parry

(57) ABSTRACT

There is disclosed a heat resistant cloth for fire fighting. At least an inner surface of a fluororesin film is subjected to plasma discharge treatment to form a treated surface. A vacuum-deposition film made of a bright metal such as aluminum is formed on the treated surface of the fluororesin film without use of a primer. The vacuum-deposition film on the treated surface is bonded to an outer surface of a substrate fabric through use of a silicone rubber adhesive in order to form a heat-reflecting layer on the outer surface of the substrate fabric. Since no primer coating layer is used, the heat reflecting layer can prevent a decrease in brightness, which would otherwise occur due to cracks generated in the primer coating layer. Thus, a decrease in heat reflectivity at high temperature is prevented. Since no flammable synthetic resin layer is used at the surface of the heat reflecting layer, flame resistance can be improved.

19 Claims, 1 Drawing Sheet

HEAT RESISTANT CLOTH FOR FIRE FIGHTING

BACKGROUND OF THE INVENTION

1. Field of the Invention

The present invention relates to an improvement of heat resistant cloth for fire fighting suitable for use in fireproof suits worn by firemen at the site of fire.

2. Description of the Related Art

A conventional heat resistant cloth for fire fighting is disclosed in Japanese Utility Model Publication (kokoku) No. 62-34765. As shown in FIG. 2, the conventional heat resistant cloth for fire fighting has a rubber layer 2 disposed on the outer surface of a substrate fabric 1 made of an aramid fiber or the like. A polyester film 4 having aluminum deposition films 3 and 5 on opposite sides thereof is bonded to the surface of the rubber layer 2 via a first bonding layer 6. A tetrafluoroethylene copolymer film 8 is bonded to the outside deposition film 3 via a second bonding layer 7.

In the conventional heat resistant cloth for fire fighting, in consideration of fabric workability, a polyester film is used for formation of deposition films through vacuum-deposition, which deposition films are provided for enhancement of heat reflectivity. However, when the heat resistant cloth for fire fighting is sewn to fabricate a firemen's suit, the polyester film is subjected to tension, with the result that the deposition films breaks and separates from the polyester film at a seam, which in turn results in deterioration of weather resistance and texture. To solve these drawbacks, the tetrafluoroethylene copolymer film serving as a protective layer is bonded to the surface of the polyester film having the deposition films.

Another conventional heat resistant cloth for fire fighting is disclosed in Japanese Patent Application Laid Open (kokai) No. 9-19412. As shown in FIG. 3, a synthetic rubber layer 10 is disposed on the surface of a substrate fabric 9, and a heat reflecting layer 15 is bonded to the surface of the rubber layer 10 via a bonding layer 11. The heat-reflecting layer 15 is composed of a tetrafluoroethylene copolymer film 14 having an inner surface 14a subjected to corona discharge treatment, and a vacuum-deposition film 12 of aluminum or the like formed on the inner surface 14a via a primer coating layer 13.

In the heat resistant cloth for fire fighting shown in FIG. 3, the weights of the substrate fabric and the synthetic rubber are reduced in order to reduce the overall weight of the heat resistant cloth. Moreover, in order to obtain soft texture and enhanced flame resistance, the polyester film of the heat resistant cloth for fire fighting shown in FIG. 2 is omitted. Instead, a tetrafluoroethylene copolymer film—which has conventionally been used as a protective layer—is used as a layer for supporting a deposition film. That is, after the inner surface of the tetrafluoroethylene copolymer film is subjected to corona discharge treatment, a deposition film is applied to the inner surface of the tetrafluoroethylene copolymer film via a primer coating layer. Subsequently, the tetrafluoroethylene copolymer film is bonded to a substrate fabric via a bonding layer.

The conventional heat resistant cloth for fire fighting shown in FIG. 3 has an improved structure such that a tetrafluoroethylene copolymer film is used to make the texture soft and enhance flame resistance; the copolymer film surface is subjected to corona discharge treatment to produce a sufficient degree of adhesiveness between the copolymer film and the deposition film; and the deposition film is formed on the copolymer film via the primer coating layer made from a synthetic resin and the thus completed heat reflecting layer 15 is bonded to the substrate fabric in order to obtain sufficient brightness to thereby achieve required heat reflectivity. However, since the heat resistance of the synthetic resin is low, the conventional heat resistant cloth causes problems at high temperature in that cracks are generated in the cloth and heat reflectivity is lowered due to decreased brightness.

Moreover, the conventional heat resistant cloths shown in FIGS. 2 and 3 have the problem that they are thick and heavy, because a rubber layer is disposed on the surface of the substrate fabric.

The conventional heat resistant cloths use an adhesive which is made of an acrylic resin, a urethane resin, or an ethylene vinylacetate resin, to which is added a flame retardant, such as aluminum hydroxide, antimony oxide, a bromic compound, or a phosphoric compound. However, there still exists the problem that the adhesiveness is low at high temperature.

SUMMARY OF THE INVENTION

In view of the foregoing, an object of the present invention is to provide heat resistant cloth for fire fighting in which, through application of plasma treatment on solely the inner surface or on both surfaces of a fluororesin film, a primer coating layer is omitted, thereby improving the adhesiveness between a fluororesin film and a vacuum-deposition film, the heat resistance of the deposition film, and the heat reflectivity of the deposition film; in which a silicone rubber adhesive is preferably used as an adhesive for a substrate fabric, thereby improving water resistance even if a synthetic rubber layer is omitted; which is thinner and lighter than a conventional heat resistant cloth; and which provides soft texture.

The present invention provides a heat resistant cloth for fire fighting, in which at least an inner surface of a fluororesin film is subjected to plasma discharge treatment to form a treated surface; a vacuum-deposition film made of a bright (reflective) metal such as aluminum is formed on the treated surface of the fluororesin film; and the vacuum-deposition deposition film on the treated surface is bonded to an outer surface of a substrate fabric through use of an adhesive in order to form a heat-reflecting layer on the outer surface of the substrate fabric.

Preferably, the adhesive is a silicone rubber adhesive.

The present invention also provides a heat resistant cloth for fire fighting, in which a vacuum-deposition film of a bright (reflective) metal such as aluminum is transferred onto an outer surface of a substrate fabric via an adhesive layer; and a fluororesin film having a plasma-discharge-treated bonding surface is bonded to the vacuum-deposition film, via the bonding surface, through use of an adhesive in order to form a heat-reflecting layer on the outer surface of the substrate fabric.

Preferably, the adhesive is a silicone rubber adhesive.

As described above, in the heat resistant cloth for fire fighting according to the present invention, a deposition film is formed on at least the inner surface of the fluororesin film after the inner surface is subjected to plasma discharge treatment. Therefore, the adhesiveness between the fluororesin film and the vacuum-deposition film and the heat resistance of the deposition film are improved. Moreover, since no primer coating layer is used, the thus-formed heat reflecting layer can prevent a decrease in brightness, which would otherwise occur due to cracks generated in the primer coating layer. Thus, a decrease in heat reflectivity at high temperature is prevented. Since no flammable synthetic resin layer is used at the surface of the heat reflecting layer, flame resistance can be improved.

In the case where a silicone rubber adhesive is used to bond together the substrate fabric and the vacuum-deposition film, heat resistance and flame retardation can be improved. Even if a synthetic rubber layer is omitted, the waterproofness can be maintained. Further, omission of the synthetic rubber layer reduces the overall weight and makes the texture softer.

Further, the heat resistant cloth for fire fighting according to the present invention can reduce the total number of layers including a primer coating layer and a synthetic rubber layer by at least two, compared with a conventional heat resistant cloth, so that the number of production steps can be decreased in order to increase productivity.

Moreover, use of a silicone rubber adhesive enhances the adhesiveness at high temperatures, and provides flame retardation without use of a toxic additive such as antimony oxide or an organic halogen compound. Moreover, since the silicone rubber has water repellence, absorption of water into the cloth during fire fighting can be prevented.

BRIEF DESCRIPTION OF THE DRAWINGS

Various other objects, features and many of the attendant advantages of the present invention will be readily appreciated from a reading of the following detailed description of the preferred embodiment when considered in connection with the accompanying drawings, in which.

DESCRIPTION OF PREFERRED EMBODIMENTS

Figure 1:
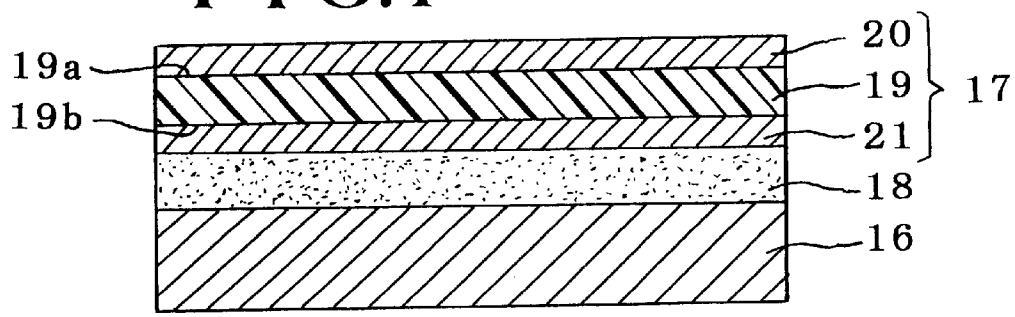
FIG. 1 is an enlarged partial cross section of heat resistant cloth for fire fighting according to an embodiment of the present invention.
Figure 2:
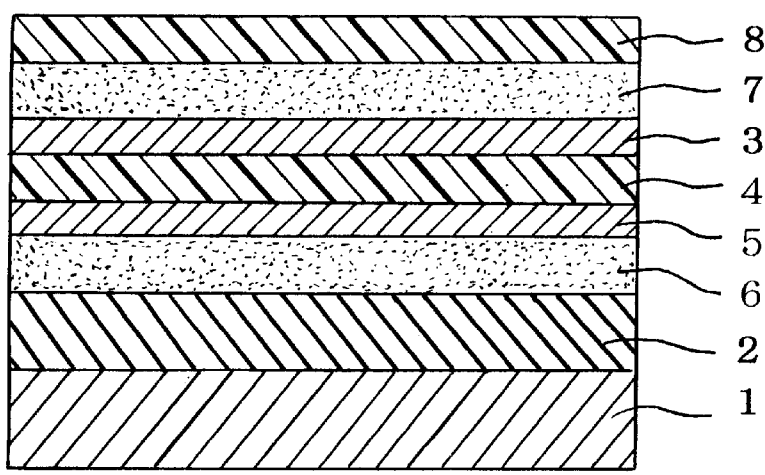
FIG. 2 is an enlarged partial cross section of a conventional heat resistant cloth for fire fighting.

Embodiments of the present invention will now be described with reference to the drawing.

FIG. 1 is an enlarged cross section of a heat resistant cloth for fire fighting according to a first embodiment of the present invention. The heat resistant cloth for fire fighting according to the present embodiment has the following structure.

As shown in FIG. 1, a substrate fabric 16 is formed from a heat resistant union cloth woven through use of a meta-type aramid spun fiber (e.g., Normex (trade name)) and a para-type aramid fiber (e.g., Kevlar (trade name)), having a weight per unit area of 160 g/m$^2$, in order to improve fire resistance, heat resistance, and physical strength.

Figure 3:
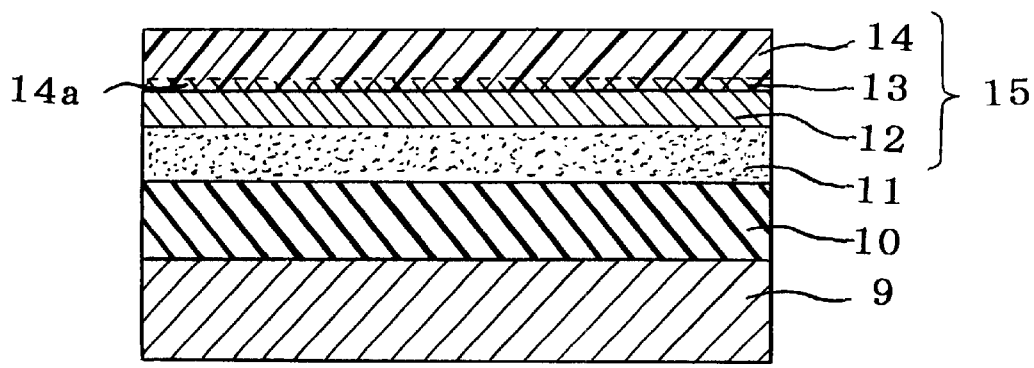
FIG. 3 is an enlarged partial cross section of another conventional heat resistant cloth for fire fighting.

On the surface of the substrate fabric 16, a heat-reflecting layer 17 is bonded by a silicone rubber adhesive 18. Preferably, the thickness of the silicone rubber adhesive 18 is approximately 20 to 80 $\mu$m. If the thickness of the silicone rubber adhesive 18 is greater than the above range, the texture becomes hard. If the thickness of the silicone rubber adhesive 18 is less than the above range, a sufficient degree of adhesiveness cannot be produced between the heat-reflecting layer 17 and the substrate fabric 16. Use of the silicone rubber adhesive 18 improves waterproofness and flame resistance, so that the synthetic rubber layer shown in FIG. 3—which has conventionally been needed to maintain waterproofness can be omitted in the present embodiment. Accordingly, the heat resistant cloth for fire fighting of the present embodiment is softer than that shown in FIG. 3. Further, the heat resistant cloth for fire fighting of the present embodiment is lighter than the conventional heat resistant cloth in the amount of the weight of the synthetic rubber layer; i.e., approximately 150 g/m$^2$.

The heat-reflecting layer 17 according to the present embodiment comprises a fluororesin film (preferably, a tetrafluoroethylene copolymer film) 19. The outer surface 19a and the inner suffice 19b of the fluororesin film 19 are subjected to plasma discharge treatment, and aluminum particles are vacuum-deposited on the treated surfaces to form the deposition films 20 and 21. The fluororesin film 19 has a thickness of 25 $\mu$m, while each of the vacuum-deposition films 20 and 21 has a thickness of approximately 0.05 $\mu$m.

Since a primer coating layer is omitted, there can be prevented a decrease in brightness, which decrease would otherwise occur due to cracks generated in the primer coating layer, so that a decrease in the heat reflectivity of the vacuum-deposition films 20 and 21 can be suppressed.

The plasma discharge treatment is a method in which a material is deposited through use of a discharge-induced plasma in the atmosphere of a specific gas at $1.0 \times 10^{-1}$ to $10 \times 10^{-2}$ torr. When aluminum particles are deposited on tetrafluoroethylene copolymer film in accordance with this method, a high degree of adhesiveness can be obtained, and the brightness or heat reflectivity can be increased to an extent necessary to endure a heat resistance test, unlike the case where vapor deposition is performed through use of corona discharge treatment. Examples of the above-described specific gas include nitrogen, oxygen, argon, carbon dioxide, and mixtures of these gases.

A heat reflection test was conducted for the heat resistant cloth for fire fighting according to the present embodiment. A first test sample having a width of 8 cm and a length of 15 cm was prepared from the heat resistant cloth for fire fighting according to the first embodiment in which the deposition film is formed on only the inner surface of the fluororesin film 19. A second test sample having a width of 8 cm and a length of 15 cm was prepared from the heat resistant cloth for fire fighting according to the first embodiment in which the deposition film is formed on both surfaces of the fluororesin film 19. Each of the samples was placed at a distance of 2.54 cm (1 inch) from an infrared heater of temperature 1,600° C. in order to heat the samples. The appearance of the sample was examined after heating for 10 seconds in the case of the first sample in which the deposition film is formed on only the inner surface of the fluororesin film 19, and after heating for 40 seconds in the case of the second sample in which the deposition film is formed on both surfaces of the fluororesin film 19. No abnormality was observed at the external surfaces of the first and second samples. Also, a heat permeability test was conducted. Filter paper was attached to each of first and second samples having the same structures and dimensions as those of the first and second samples as described above, and each sample was placed at a distance of 2.54 cm (1 inch) from an infrared heater of temperature 1,600° C. in order to heat the samples. The appearance of the paper filter was examined after heating for 10 seconds in the case of the first sample in which the deposition film is formed on only the inner surface of the fluororesin film 19, and after heating for 40 seconds in the case of the second sample in which the deposition film is formed on both surfaces of the fluororesin film 19. No abnormality was observed in terms of appearance in the paper filters attached to the first and second samples. These tests were conducted as an in-plant inspection.

Next, a description will be given of a heat resistant cloth for fire fighting according to a second embodiment of the present invention. In the heat resistant cloth, a vacuum-deposition film of a bright (reflective) metal such as aluminum is transferred onto an outer surface of a substrate fabric via a flame resistant adhesive layer made from, for example, a urethane resin to which a flame retardant is added. Subsequently, a fluororesin film having a plasma-discharge-treated bonding surface is bonded to the vacuum-deposition film, via the bonding surface and through use of an adhesive, in order to form a heat-reflecting layer on the outer surface of the substrate fabric.

In the above-described first and second embodiments, a silicone rubber adhesive is preferably used as the flame resistant adhesive.

In each of the embodiments mentioned above, a bright metal is deposited on both surfaces of a fluororesin film. However, a vacuum-deposition film according to the present invention may alternatively be formed solely on the inner surface of a fluororesin film. In this case, the outer surface of the fluororesin film may be left untreated with plasma discharge.

In the present invention, the vacuum-deposition film made of a bright metal may be formed on solely the inner surface or on both surfaces of a tetrafluoroethylene copolymer film through use of powder of titanium, tin, or chromium rather than aluminum.

In the present invention, the film to be subjected to plasma discharge treatment may be any kind of fluororesin film. However, a tetrafluoroethylene copolymer film is preferably used.

In the present invention, the material of substrate fabric is not limited to that used in the above-described embodiments. For example, the substrate fabric may be formed from only para-type aramid fiber. In this case, the substrate fabric becomes lighter. Further, materials having high flame resistance, heat resistance, and physical strength are preferably used for the substrate fabric.

The present invention is not limited to the above-described embodiments. Numerous modification and variations of the present invention are possible in light of the spirit of the present invention, and they are not excluded from the scope of the present invention.

What is claimed is:

1. A heat resistant cloth for fire fighting, in which at least an inner surface of a fluororesin film is subjected to plasma discharge treatment to form a treated surface; a vacuum-deposition film made of a bright metal such as aluminum is formed on the treated surface of the fluororesin film; and the vacuum-deposition film on the treated surface is bonded to an outer surface of a substrate fabric through use of an adhesive in order to form a heat-reflecting layer on the outer surface of the substrate fabric.

2. A heat resistant cloth for fire fighting according to claim 1, wherein the adhesive is a silicone rubber adhesive.

3. A heat resistant cloth for fire fighting, in which a vacuum-deposition film of a bright metal such as aluminum is transferred onto an outer surface of a substrate fabric via an adhesive layer; and a fluororesin film having a plasma-discharge-treated bonding surface is bonded to the vacuum-deposition film, via the bonding surface, through use of an adhesive in order to form a heat-reflecting layer on the outer surface of the substrate fabric.

4. A heat resistant cloth for fire fighting according to claim 3, wherein the adhesive is a silicone rubber adhesive.

5. A heat resistant cloth comprising:
   a. a substrate material;
   b. a fluororesin film having at least one treated surface on which a bright metal film is deposited; and
   c. a bonding agent for bonding the fluororesin film to said substrate material.

6. The heat resistant cloth of claim 5 wherein the fluororesin film has a first major surface which is treated by plasma discharge for form a adhesion surface on the fluororesin film for directly receiving the bright metal by vacuum deposition.

7. The heat resistant cloth of claim 6 wherein the bright metal is aluminum.

8. The heat resistant cloth of claim 7 wherein the bonding agent is silicon rubber adhesive having a thickness between 20 to 80 $\mu$m.

9. The heat resistant cloth of claim 7 wherein the fluororesin film is a tetrafluoroethylene copolymer film.

10. The heat resistant cloth of claim 9 wherein the fluororesin film has a thickness of approximately 25 $\mu$m.

11. The heat resistant cloth of claim 7 wherein the fluororesin film has a second major surface which is treated by plasma discharge for form another adhesion surface on the fluororesin film for directly receiving a bright metal by vacuum deposition.

12. A heat resistant cloth comprising:
   a. a flexible substrate material;
   b. a fluororesin film having at least one treated surface;
   c. an metal film having a bright surface for reflecting heat, the metal film being directly bonded to a major surface of the fluororesin film; and
   d. an adhesive agent for bonding the fluororesin film to the flexible substrate material.

13. The heat resistant cloth of claim 12 wherein the metal film is disposed between the fluororesin film and the substrate material.

14. The heat resistant cloth of claim 13 wherein a second metal film having a bright surface for reflecting heat is bonded to an opposing surface of the fluororesin film whereby the fluororesin film is thereby provided with two bright metal surfaces for reflecting heat and wherein the adhesive agent contacts one of two bright metal surfaces for bonding the fluororesin film to the flexible substrate material.

15. The heat resistant cloth of claim 14 wherein the second aluminum film occurs on an exposed surface of the heat resistant cloth.

16. The heat resistant cloth of claim 15 wherein the fluororesin film is a tetrafluoroethylene copolymer film.

17. The heat resistant cloth of claim 16 wherein the substrate material is a woven cloth made of aramid fiber.

18. The heat resistant cloth of claim 17 wherein the woven cloth of aramid fiber occurs on the other exposed surface of the heat resistant cloth.

19. The heat resistant cloth of claim 18 wherein the metal films are films of aluminum.

\* \* \* \* \*